Dec. 21, 1937.     R. C. KIVLEY     2,102,721

MATERIAL WORKING APPARATUS

Filed Feb. 9, 1935

INVENTOR
R. C. KIVLEY
BY H. R. Whitehorn
ATTORNEY

Patented Dec. 21, 1937

2,102,721

UNITED STATES PATENT OFFICE 2,102,721

MATERIAL WORKING APPARATUS

Ray C. Kivley, Oak Park, Ill., assignor to Western Electric Company, Incorporated, New York, N. Y., a corporation of New York Application February 9, 1935, Serial No. 5,718

2 Claims. (Cl. 164—51)

This invention relates to material working apparatus, and more particularly to material holding devices for material working apparatus, such as material shearing and punching machines.

The primary object of this invention is to provide an effective and simple device for automatically holding and releasing material in timed relation with the operation of a material working apparatus.

In accordance with one embodiment of this invention as used in connection with a material shearing apparatus employing a reciprocative material shearing blade and a cooperating stationary die member, there is provided a material holding or clamping device comprising a wedge block reciprocative in a channel in the stationary die member through which the material to be sheared is fed, one side of the wedge block engaging the material and the opposite side engaging an inclined surface of the die member. Operative connections are arranged between the means for actuating the shearing blade and the wedge block whereby in timed relation to the actuation of the blade the wedge block is operated to clamp the material during the shearing movement of the blade and is released during the return movement thereof, during which latter movement or at the completion thereof the material is fed forward for the succeeding shearing operation.

Figure 1:
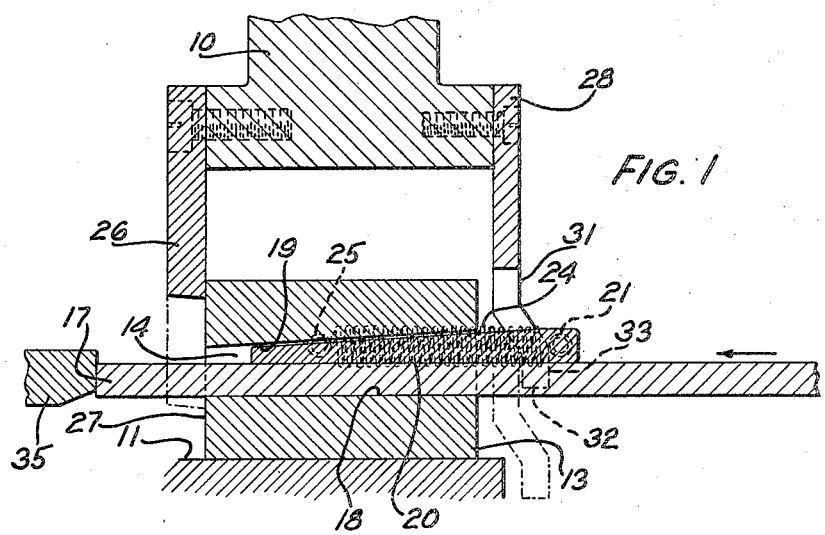
Figure 2:
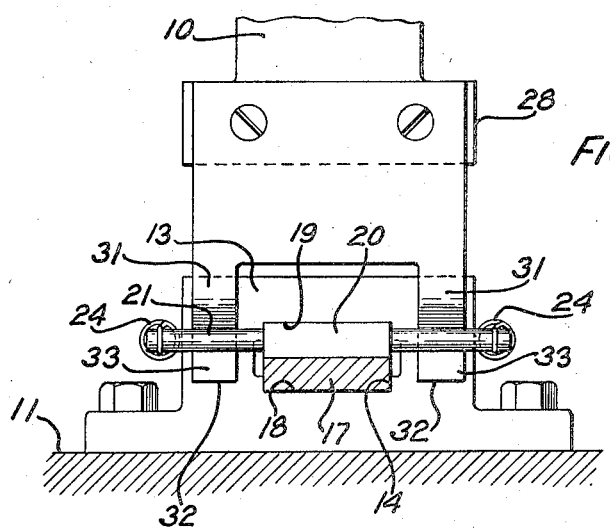

The invention will be more fully understood by referring to the following detailed description read in conjunction with the accompanying drawing forming a part thereof, in which Fig. 1 is a fragmentary vertical central section through a material shearing apparatus embodying the invention, and Fig. 2 is an end view of the same, looking from the right of Fig. 1.

As illustrated in the drawing the work or material clamping device embodying the features of this invention has been shown applied to a metal strip shearing machine which may be of any usual type, for instance, a punch press. Since it is not essential to a complete understanding of the invention the machine has not been illustrated, except those parts directly concerned with the invention, which comprise the following: A vertical reciprocative platen and a stationary bed 10 and 11, respectively. Fixed to the upper surface of the machine bed 11 is a shearing die 13 having formed therein a horizontally extending channel 14 for guiding and supporting elongated metal 17 to be sheared in the operation of the machine. The metal strip 17 rests upon a lower horizontal surface 18 of the channel 14, an opposite upper surface 19 thereof being suitably inclined. Carried in the channel 14 above the strip 17 with its lower surface engaging the strip is a wedge block 20. The upper surface of the wedge block 20 is inclined at an angle similar to that of the inclined surface 19 of the channel 14. At its right outer end (Fig. 1) the wedge block 20 carries a pin 21 which extends therethrough and projects from each side thereof and outwardly from parallel sides of the shearing die 13. Attached to each end of the pin 21 is a coiled tension spring 24, the opposite ends of the springs being attached to pins 25 fixed to the corresponding sides of the shearing die. The tension of the springs 24 is such that the wedge block 20 will be drawn or forced inwardly to hold or clamp the metal strip 17 from movement on the surface 18 of the die channel 14 when the springs are permitted to act in a normal manner.

Fixed to the left end of the reciprocative platen 10 (Fig. 1) is a shearing blade 26 which in a downward movement of the platen cooperates with a shearing surface 27 of the die 13 to shear the metal strip 17 projecting from the die surface. At its right end the platen 10 carries a cam plate 28 having two spaced depending arms 31 formed at their lower ends with similar offset portions 32 which are formed with cam surfaces 33. The cam surfaces 33 are continually engaged with the opposite ends of the pin 21 projecting from the wedge block 20 and the contour of the cam surfaces is such that in the upper or retracted position of the platen 10, as shown in the drawing, the wedge block is held in an inoperative or released position against the tension of the springs 24, constantly tending to draw or force the wedge block into an operative holding or clamping position.

The operation of the hereinbefore described automatic material holding device in one application thereof to a strip shearing machine is as follows: In the drawing the machine is shown in its normal position with the platen 10 at the upper end of its movement, after the completion of a shearing operation, and with the strip of metal 17 advanced through the die 13 a desired distance, as determined by a stop member 35, in preparation for the succeeding shearing operation. In this position the platen 10 carrying the shearing blade 26 and the cam plate 28 is caused to descend. Before the shearing blade 26 moves into engagement with the strip 17, the cam surfaces 33 of the cam plate 28 which are engaging the ends of the pin 21 are moved downwardly to the position indicated in fragmentary dotted outline (Fig. 1), whereupon the tension springs 24 are permitted to act upon the wedge block 20. The released energy stored in the spring 24 immediately draws or forces the wedge block 20 to the left, the cooperating inclined surfaces of the wedge block and the die serving to firmly hold or clamp with a desired pressure, or resistance to movement, of the strip 17, to be sheared, to the horizontal surface 18 of the channel 14 in the die 13. In timed relation to the clamping of the strip 17 in position for shearing, the shearing blade 26 in its continued downward movement, engages the strip 17 and shears the portion thereof projecting from the shearing surface 27 of the die 13. In the return or upward movement of the platen 10, the cam surfaces 33 of the cam plate 28 cause the pin 21 and the wedge block 20 to be shifted to the right against the force of the attached springs 24, thus restoring energy in the springs 24 and releasing the strip 17, whereupon the strip may be fed forward, in the direction of the arrow (Fig. 1), a distance, limited by the position of the stop member 35, for the succeeding shearing operation.

Although in the herein described and illustrated embodiment of the invention the material holding or clamping element is actuated to its operative position by spring action it may be desirable in the case of material which is extremely uniform in thickness throughout its length to provide a positive connection between the element and the reciprocative platen so that the element will be actuated to its operative position and retracted therefrom directly from the movement of the platen.

From the foregoing description it will be apparent that a simple automatic work or material holding or clamping device is provided for use with material working apparatus whereby the material to be worked may be automatically positively held with a desired pressure, or resistance to movement, and after being worked released in timed relation to the operation of the apparatus.

It will be understood that the embodiment herein described is merely illustrative of the invention and one application thereof, the invention being limited only by the scope of the appended claims.

What is claimed is:

1. In a material working apparatus, a support for the material having a tapered channel therein for the passage of elongated material, means movable to and from the material for working thereon, means reciprocative in said channel effective in one position thereof in cooperation with a tapered side of said channel and the material for holding the material relative to the support and in another position releasing the material, and means including an operative connection between the working means and the holding means responsive to the movement of the working means towards the material for actuating the holding means to hold the material and actuating the holding means to release the material during the movement of the working means from the material.

2. In a material working apparatus, cooperating reciprocative and stationary material working elements, said stationary element having an opening therethrough extending at an angle to the movement of said reciprocative element, an upper wall of the opening having an inclined surface, the material being supported on a surface of a lower wall of and within the opening of said stationary element, a reciprocative wedge block extending into the opening between the upper surface of the material and the inclined surface, and means including an elastic actuator responsive to a movement of said reciprocative working element towards the material to move said wedge block into wedging relation with the inclined surface and the upper surface of the material to clamp the material to said stationary element and retracting the wedge block during a movement of said reciprocative working element from the material.

RAY C. KIVLEY.